US010025974B1

(12) United States Patent
Felder et al.

(10) Patent No.: US 10,025,974 B1
(45) Date of Patent: Jul. 17, 2018

(54) BOXING MOTION SYSTEM AND METHOD

(71) Applicants: William Felder, Houston, TX (US); Elizabeth Felder, Houston, TX (US)

(72) Inventors: William Felder, Houston, TX (US); Elizabeth Felder, Houston, TX (US)

( * ) Notice: Subject to any disclaimer, the term of this patent is extended or adjusted under 35 U.S.C. 154(b) by 0 days.

(21) Appl. No.: 15/089,566

(22) Filed: Apr. 3, 2016

Related U.S. Application Data

(60) Provisional application No. 62/142,989, filed on Apr. 3, 2015.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *G06K 9/00* | (2006.01) |
| *A63B 24/00* | (2006.01) |
| *A63F 13/211* | (2014.01) |
| *A63F 13/42* | (2014.01) |
| *G09B 19/00* | (2006.01) |

(52) U.S. Cl.
CPC ...... *G06K 9/00342* (2013.01); *A63B 24/0006* (2013.01); *A63F 13/211* (2014.09); *A63F 13/42* (2014.09); *G06K 9/00369* (2013.01); *G09B 19/0038* (2013.01)

(58) Field of Classification Search
USPC .................................. 463/11, 15, 20, 22, 39
See application file for complete search history.

(56) References Cited

U.S. PATENT DOCUMENTS

| | | | | |
|---|---|---|---|---|
| 8,408,982 | B2 | 4/2013 | Marty et al. | |
| 8,588,517 | B2 | 11/2013 | Lee et al. | |
| 8,638,985 | B2 | 1/2014 | Shotten et al. | |
| 2005/0017454 | A1* | 1/2005 | Endo ....................... | G06F 3/016 273/317.1 |
| 2008/0246734 | A1* | 10/2008 | Tsui ....................... | H02J 7/0055 345/169 |
| 2008/0258921 | A1* | 10/2008 | Woo ..................... | A61B 5/0002 340/573.1 |

* cited by examiner

*Primary Examiner* — Adetokunbo O Torimiro
(74) *Attorney, Agent, or Firm* — RG Patent Consulting, LLC; Rachel Gilboy

(57) ABSTRACT

Boxing video game and monitor system for one or more players. In this system, video game/platform has interactive tutorial software on sport of boxing configured to simulate boxing movements of past and present boxing champions. One or more body sensors in this system attach to one or more body parts of one or more players. One or more body sensors evaluate player video directed movements and make suggestions to improve movements of one or more players when one or more players are replicating the boxing movements of past and present boxing champions.

20 Claims, 6 Drawing Sheets

BOXING MOTION SYSTEM AND METHOD

CROSS-REFERENCE TO RELATED APPLICATION

The present application is related to and claims priority from prior provisional application Ser. No. 62/142,989, filed Apr. 3, 2015, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of video game devices and more specifically relates to a video game and platform that is configured as an interactive tutorial on the sport of boxing to provide both budding pugilists and game enthusiasts an exciting new tool that is as instructive as it is fun.

2. Description of the Related Art

Boxing, often called "the manly art of self-defense," is a sport in which two competitors try to hit each other with their glove-encased fists while trying to avoid each other's blows. The competition is divided into a specified number of rounds, usually 3 minutes long, with 1-minute rest periods between rounds. Although amateur boxing is widespread, professional boxing has flourished on an even grander scale since the early 18th century. Professional boxers are internationally famous, particularly heavyweight champions, most of whom, in this century, have come from the United States. Among the best heavyweights have been Muhammad Ali, Jack Dempsey, Jack Johnson, Joe Louis, Rocky Marciano, and Gene Tunney.

Outstanding champions in the lighter weights have included Benny Leonard, Mickey Walker, Barney Ross, Henry Armstrong, and Sugar Ray Robinson. Current champions have won titles in several weight classes, such as Floyd Mayweather, Jr., Juan Marquez, and Manny Pacquiao. With the continued, growing popularity of boxing, especially in the United States, many high schools and colleges have added boxing programs to their athletic departments.

Various attempts have been made to solve problems found in video game device art. Among these are found in: U.S. Pat. No. 8,588,517 to Johnny Lee; U.S. Pat. No. 8,408,982 to Marty et al; and U.S. Pat. No. 8,638,985 to Jamie Daniel Joseph Shotton. This prior art is representative of boxing video games and monitors using body motion sensors.

None of the above inventions and patents, taken either singly or in combination, is seen to describe the invention as claimed. Thus, a need exists for a reliable boxing video game and platform configured to provide pugilists and game enthusiasts an exciting new tool that is as instructive as it is fun and to avoid many, most, or all of the above-mentioned problems

BRIEF SUMMARY OF THE INVENTION

In view of the foregoing disadvantages inherent in the known video game device art, the present invention provides a novel Boxing Motion. The general purpose of the present invention, which will be described subsequently in greater detail, is to provide a video game and platform that is configured as an interactive tutorial on the sport of boxing to provide both budding pugilists and game enthusiasts an exciting new tool that is as instructive as it is fun.

A boxing video game and monitor system for one or more players. In this system, a video game/platform has interactive tutorial software on sport of boxing configured to simulate boxing movements of past and present boxing champions. One or more body sensors attached to one or more body parts of the one or more players. One or more body sensors configured to evaluate player video directed movements and make suggestions to improve movements of one or more players when one or more players are replicating the boxing movements of past and present boxing champions.

A method is disclosed for training one or more players using boxing video game and monitoring system. In this method, one or more body sensors attach to one or more body parts of one or more players. Further, video game/platform simulates using an interactive tutorial software boxing movements of past and present boxing champions on sport of boxing. One or more body sensors player video directed movements are evaluated and provide suggestions to improve movements of one or more players as the one or more players are replicating boxing movements of past and present boxing champions.

The present invention holds significant improvements and serves as a Boxing Motion System and Method. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Boxing Motion System constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to Boxing Motion System and more particularly to Boxing Motion System as used to improve player's hand, foot, eye coordination, and sports strategy schemes responsive to movements of past and present boxing champions.

Generally speaking, embodiments of the present invention relate to video game device and more particularly to Boxing Motion, a video game and platform configured as an interactive tutorial on the sport of boxing to provide both budding pugilists and game enthusiasts an exciting new tool that is as instructive as it is fun.

Figure 1:
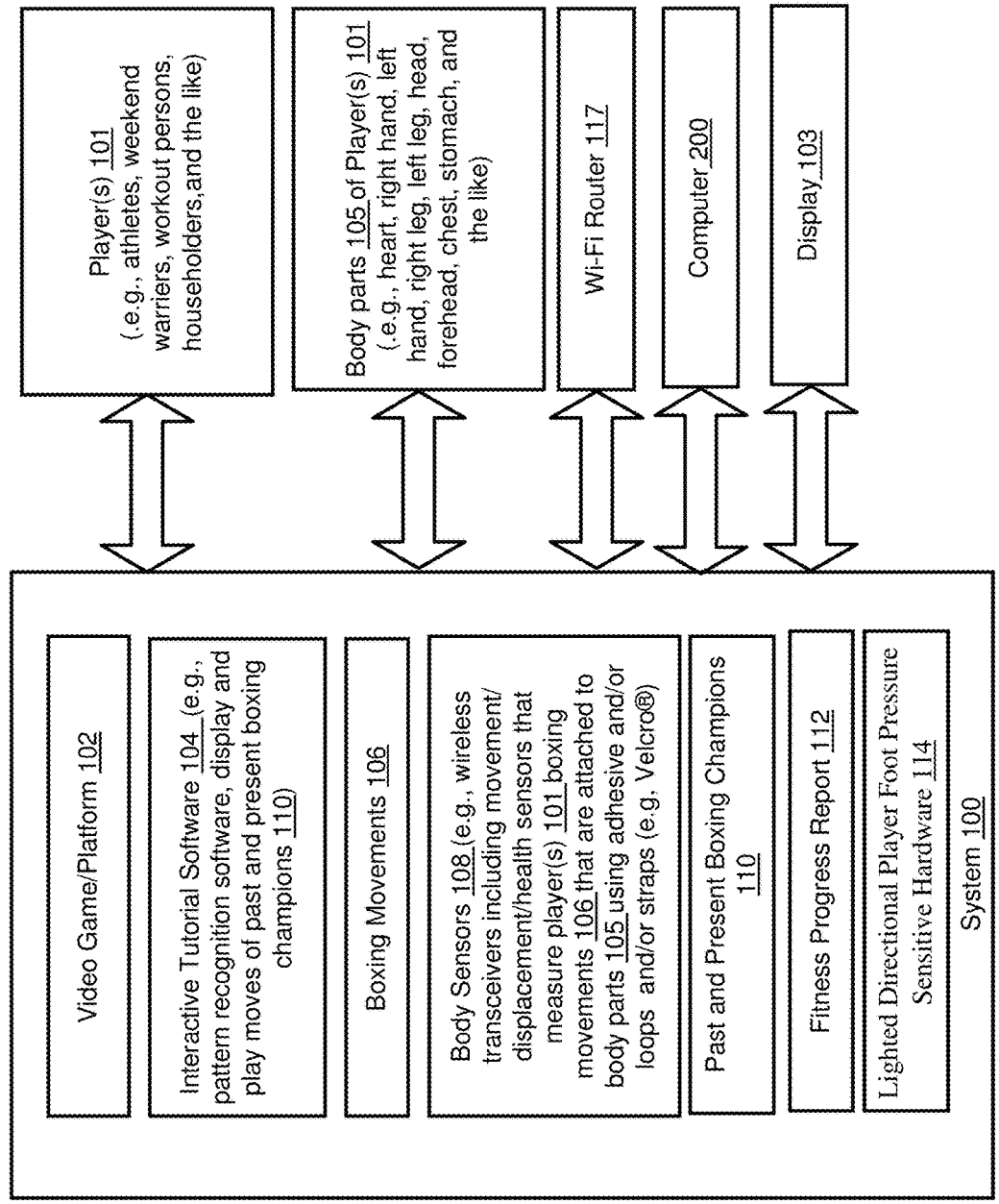
FIG. 1 shows a block diagram illustrating Boxing Motion System 100 according to an embodiment of the present invention.

FIG. 1 shows a block diagram illustrating Boxing Motion System 100 according to an embodiment of the present invention.

Referring to the drawings by numerals of reference there is shown in FIG. 1, boxing video game and monitor system 100 for one or more players 101. System 100 includes video game/platform 102 having interactive tutorial software 104 on sport of boxing configured to simulate boxing movements 106 of past and present boxing champions 110. System 100 further includes one or more body sensors 108 attached to one or more body parts 105 of one or more players 101. In system 100, one or more body sensors 108 evaluate player video directed movements 106 and make suggestions to improve movements 106 of one or more players 101 when one or more players 101 are replicating boxing movements 106 of past and present boxing champions 110.

In one or more embodiments, one or more body parts 105 include heart, right hand, left hand, right leg, left leg, and stomach of one or more players 101. In one example, the player video directed movements 106 include provide pattern of player footwork timed with player eye motions and player hand punching motions. In some embodiments, video game/platform 102 includes one or more lighted directional player foot pressure sensitive hardware 114 and pattern recognition software 104 that evaluates one or more players' 101 movements 106 and provides real-time feedback and monitoring of foot work to one or more players 101.

Advantageously, in one or more embodiments, by providing real-time feedback to player(s) 101, for example, through audio/visual queues, through computer 200 speakers and/or display 103 and/or electronic/vibration simulation to body sensors 108, player(s) can adjust/redirect movements of one or more body parts 106 to better replicate present or past champions 110 movements 106 and again receive additional feedback in, for example, an expedited real-time and/or extemporaneous manner.

Figure 3:
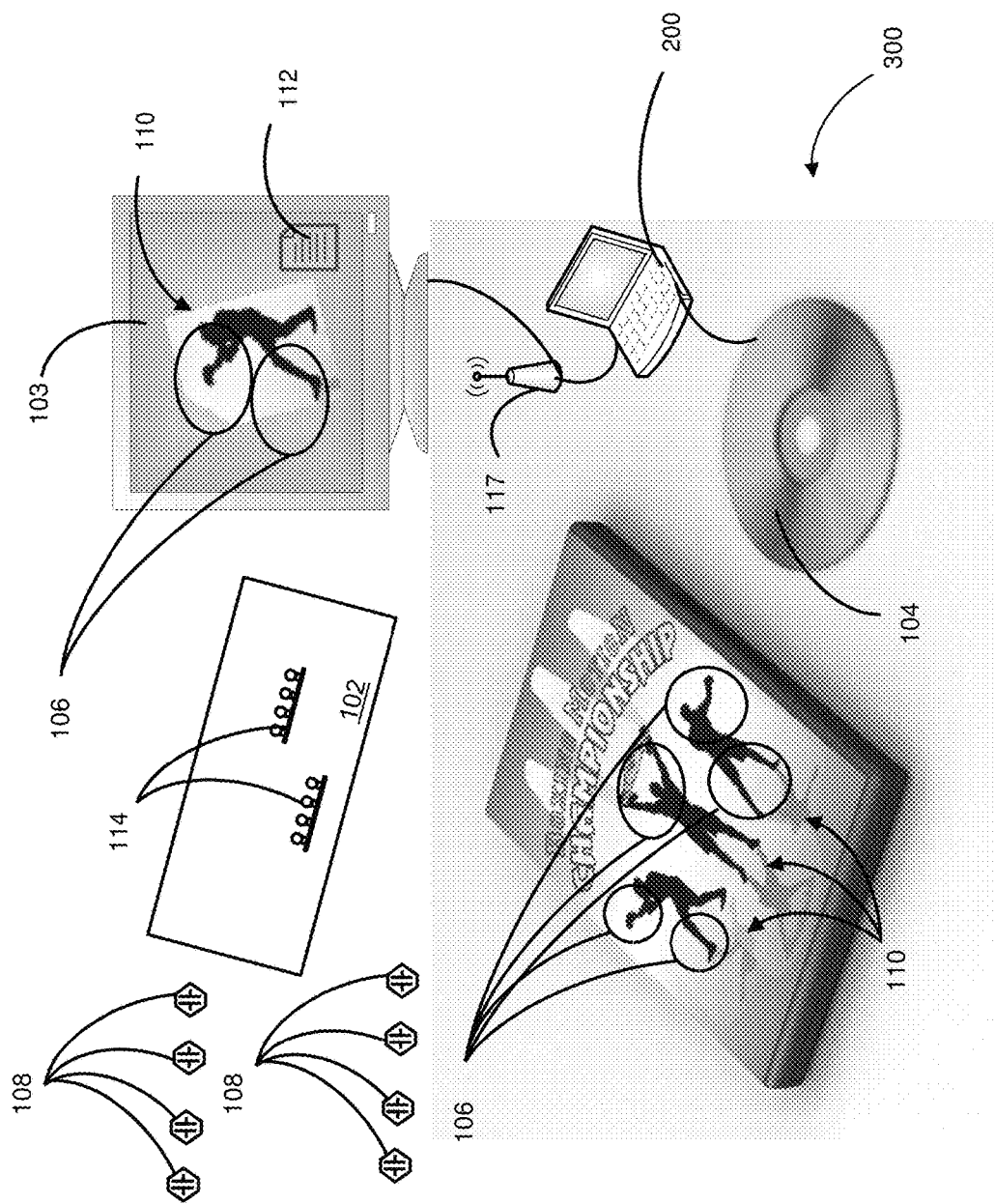
FIG. 3. is a perspective view that illustrates software/hardware product including body sensors 108, interactive tutorial software 104, and video game/platform 102 illustrating Boxing Motion System 100 according to an embodiment of the present invention of FIG. 1.
Figure 4:
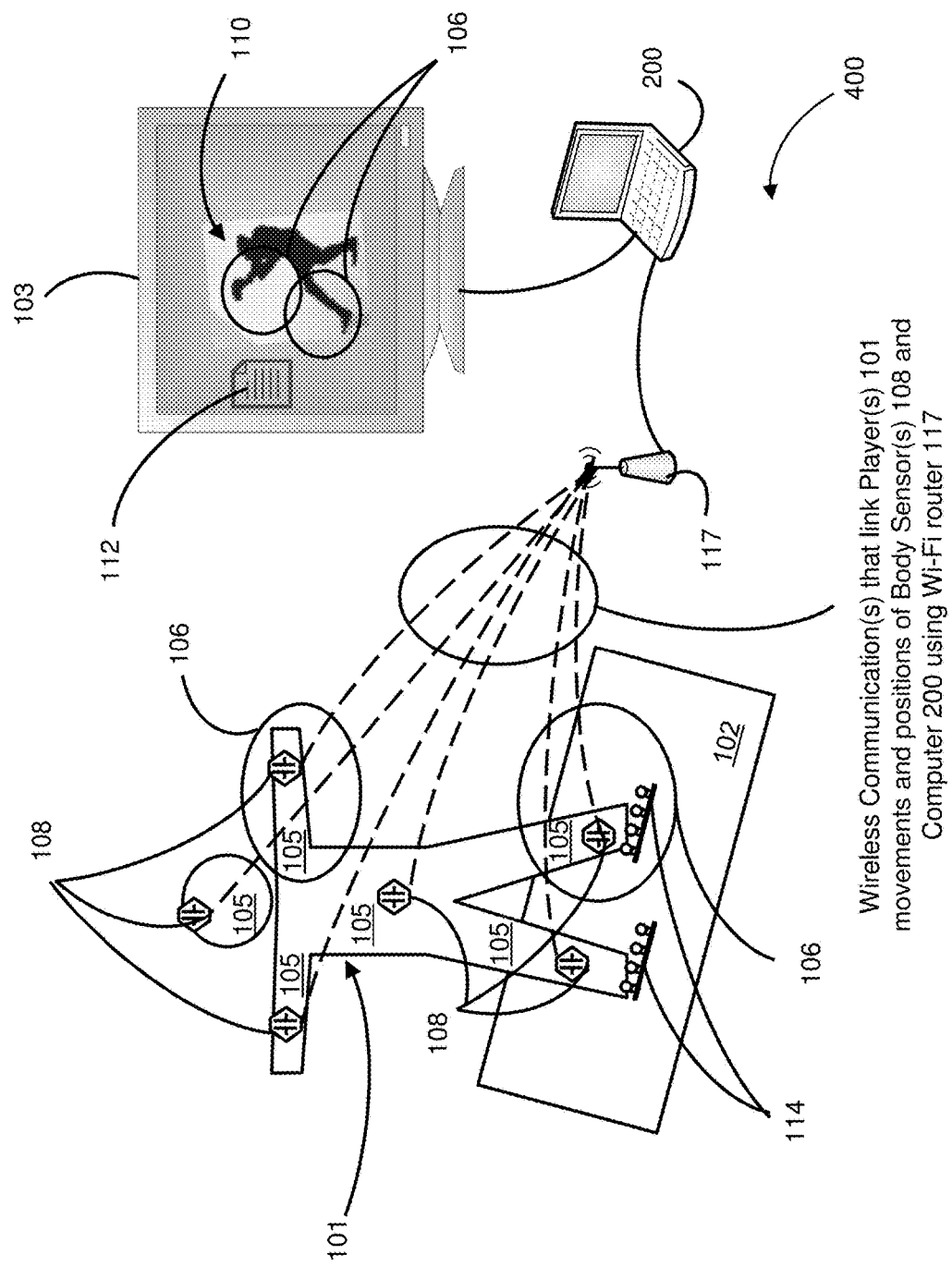
FIG. 4. is a perspective view illustrating software/hardware product and player 101 having body sensors 108 replicating past and present boxing champions 110 on display 103 and wireless communicating signals using computer 200 through Wi-Fi router 117 and body sensors 108 illustrating Boxing Motion System 100 according to an embodiment of the present invention of FIG. 1.

Advantageously, in some embodiments, for examples as illustrated in FIGS. 3 and 4, body sensors 108 include wireless transceivers and movement/displacement/health sensors that measure player(s) 101 displacements and movements of body parts 105, for example, boxing movements 106. In addition, in some embodiments, body sensors 108 are attached to body parts 105 using adhesive and/or loops and/or straps (e.g., Velcro®)

In one or more embodiments, one or more body sensors 108 configured to vibrate or provide other audio cues that assist coordination between punching and blocking motions and foot work of one or more players 101. One or more body sensors 108 are electronic motion monitors that track coordination between arm to arm motion responsive to foot work and in coordination between one or more of players 101 actual or predicted motion. For example, as illustrated in FIG. 4, wireless communication(s) link player(s) 101 movements, e.g., changes of player(s) 101 body parts 105 absolute/relative coordinate positions, e.g., X, Y, Z, of body sensor(s) 108, between computer 200 and recommended or suggested movements by tutorials provided by interactive tutorial software 104 displayed on display 103, for example, communicated through Wi-Fi router 117.

In some embodiments, interactive tutorial software 104 would be programmed as an interactive game, wherein each player of one or more players 101 attempts to simulate successful signature moves, e.g., hand, arm, blocking, foot work, and the like, of past and present boxing champions 110 including, for example, Sugar Ray Robinson's lateral footwork and power combos, Muhammad Ali's rope-a-dope, Floyd Mayweather's Pull Counter and Lunging Left Hook, and Manny Pacquiao's one legged straight left.

In some embodiments, one or more players 101 coordination, concentration, strength of punching, different fighting styles, and signature moves of past and present boxing champions 110 are monitored and recorded and provided as portion of fitness progress report 112. For example, fitness progress report 112 includes percentage of full body workout completed at an end of one or more boxing sessions for each player of one or more players 101.

In some embodiments, one or more players 101 participate in one or more simulated sparing contests with past and present boxing champions 110 and one or more players 101 performance including strength and punching skill level is reported as part of a fitness progress report 112.

In some embodiments, one or more players 101 participate in one or more simulated sparing contests with past and present boxing champions 110 for training exercises as well as general amusement. In some embodiments, one or more players 101 are monitored to determine adherence to boxing rules and regulations. For example, fitness report 112 provides information including highlights strength, accuracy, and punch connection percentage replicating boxing movements 106, for example, simulated by interactive tutorial software 104, with boxing movements 106 of past and present boxing champions 110 of each of one or more players 101. In one example, punch connection percentage, for example, is recorded and monitored, upon replication of boxing movements 106 simulated by interactive tutorial software 104 with boxing movements 106 of past and present boxing champions 110 with one or more players 101.

In summary, Boxing Motion comprising a novel product offering consumers a practical solution to the aforementioned challenges. As the name implies, Boxing Motion comprises a specially designed video game/platform that is configured as an interactive tutorial on sport of boxing. Hardware for Boxing Motion could be presented in a standalone form, or could be licensed to a system such as Xbox Kinect, Wii and arcade distributors. These systems are presented as an example because Boxing Motion is conceived as working with body through sensor technology.

As for software, Boxing Motion would be programmed as an interactive game, wherein each player would attempt to simulate successful moves of such past and present champions as those mentioned in the above paragraph. For example, Sugar Ray Robinson's lateral footwork and power combos, Muhammad Ali's rope-a-dope, Floyd Mayweather's Pull Counter and Lunging Left Hook, and Manny Pacquiao's one legged straight left are just a few of many signature boxing moves that could be incorporated into Boxing Motion. As can be imagined, the possibilities inherent in this invention are virtually limitless.

Teaching users (e.g., players) coordination, concentration, and a host of different fighting styles, this product would instill a valuable history lesson on the world of pugilism while providing a full body workout for users. As strength and skill improve as a result of continued use of Boxing Motion, budding boxers will find themselves more than ready to enter an actual ring to face a real-life opponent. As Boxing Motion is created to be used for training exercises as well as general amusement, adhering to all boxing rules and regulations, this product would be appreciated by boxing coaches and athletic instructors the world over. Boxing Motion is cost-effective to produce in the embodiments, as shown in FIG. 1.

Figure 2:
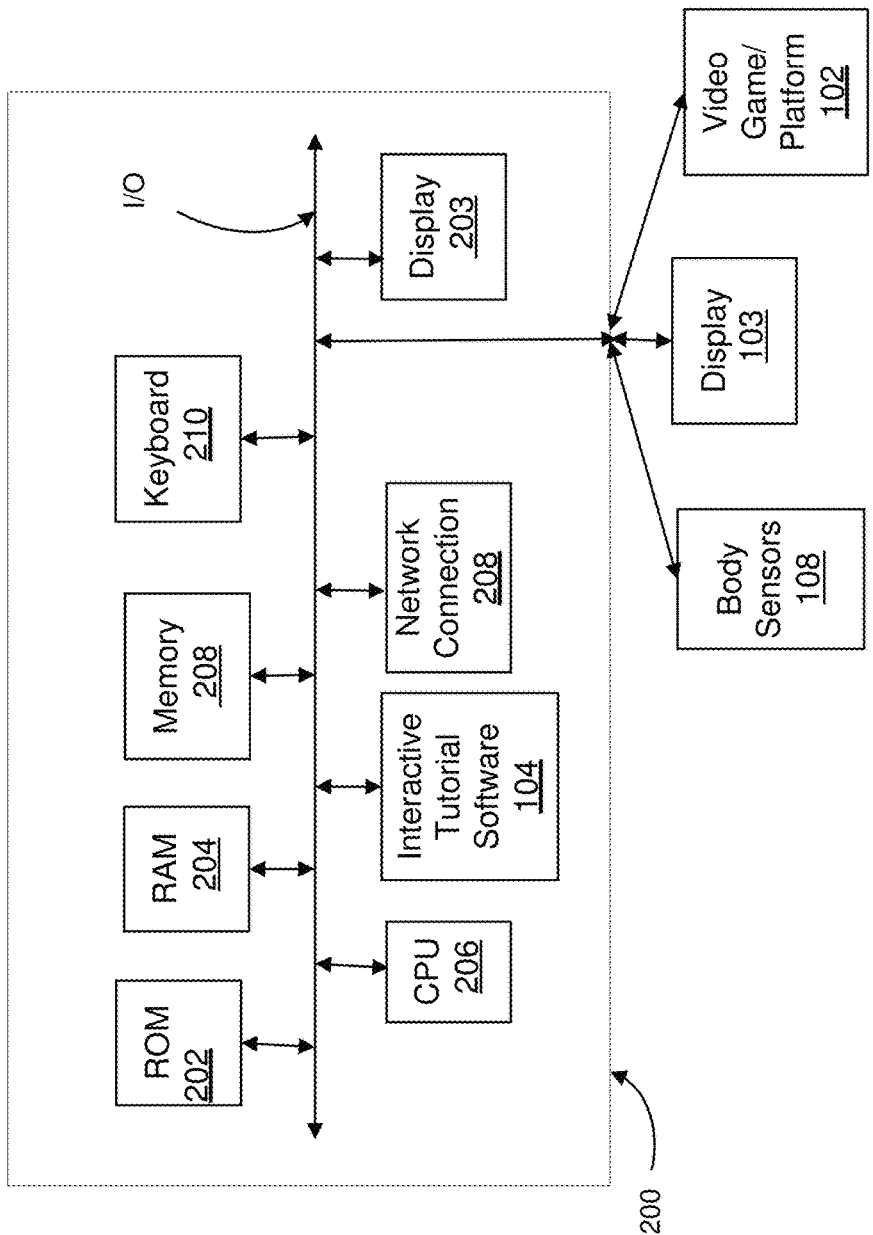
FIG. 2 illustrates an exemplary embodiment of processing system 200 illustrating interaction between interactive tutorial software 104, video game/platform 102, display 103, and body sensors 108 according to an embodiment of the present invention of FIG. 1.

FIG. 2 illustrates an exemplary embodiment of processing system 200 illustrating interaction between interactive tutorial software 104, video game/platform 102, and one or more body sensors 108 according to an embodiment of the present invention of FIG. 1.

Referring now to FIG. 2, an exemplary embodiment of processing system 200. Device(s) connect(s) to network in FIG. 1 includes a processing system. Processing system 200 has a central processing unit (CPU) 206 that may be a processor, microprocessor, or any combination of processors and microprocessor that executes instructions stored in memory to perform an application. CPU 206 connects memory bus and Input/Output bus (I/O bus). A non-volatile memory, such as, Read Only Memory (ROM) 202 is connected to CPU 206 via memory bus 214. ROM 202 stores instructions for initialization and other systems command Volatile memory such as Random Access Memory (RAM) 204, for example, DRAM, and/or SDRAM, connects to CPU 206 via memory bus. RAM, DRAM, SDRAM 204 or the like stores instructions for processes that are executed and data operated on by one or more executed processes. Peripheral devices include memory, display, I/O device, and network connection device connected to CPU 206 via I/O bus. I/O bus carries data between interactive tutorial software 104, video game/platform 102, body sensors 108 motion determined by software algorithms, for example, at least in part by interactive tutorial software 104, display 103, and CPU 206. Memory, e.g., read/write compact discs (CDs) and magnetic disk drives, stores data unto a media. Display 203 is a monitor and/or display and associated drivers, including electronic drivers and electronic modules, that convert data to a display. I/O device is a keyboard, a pointing device or other device that may be used by a user to input data. Network device is a modem or Ethernet that connects processing system 200 to a network.

FIG. 3. is a perspective view that illustrates software/hardware product including body sensors 108, interactive tutorial software 104, and video game/platform 102 illustrating Boxing Motion System 100 according to an embodiment of the present invention of FIG. 1.

FIG. 4. is a perspective view illustrating software/hardware product and player 101 having body sensors 108 replicating past and present boxing champions 110 on display 103 and wireless communicating signals using computer 200 through Wi-Fi router 117 and body sensors 108 illustrating Boxing Motion System 100 according to an embodiment of the present invention of FIG. 1.

Figure 5:
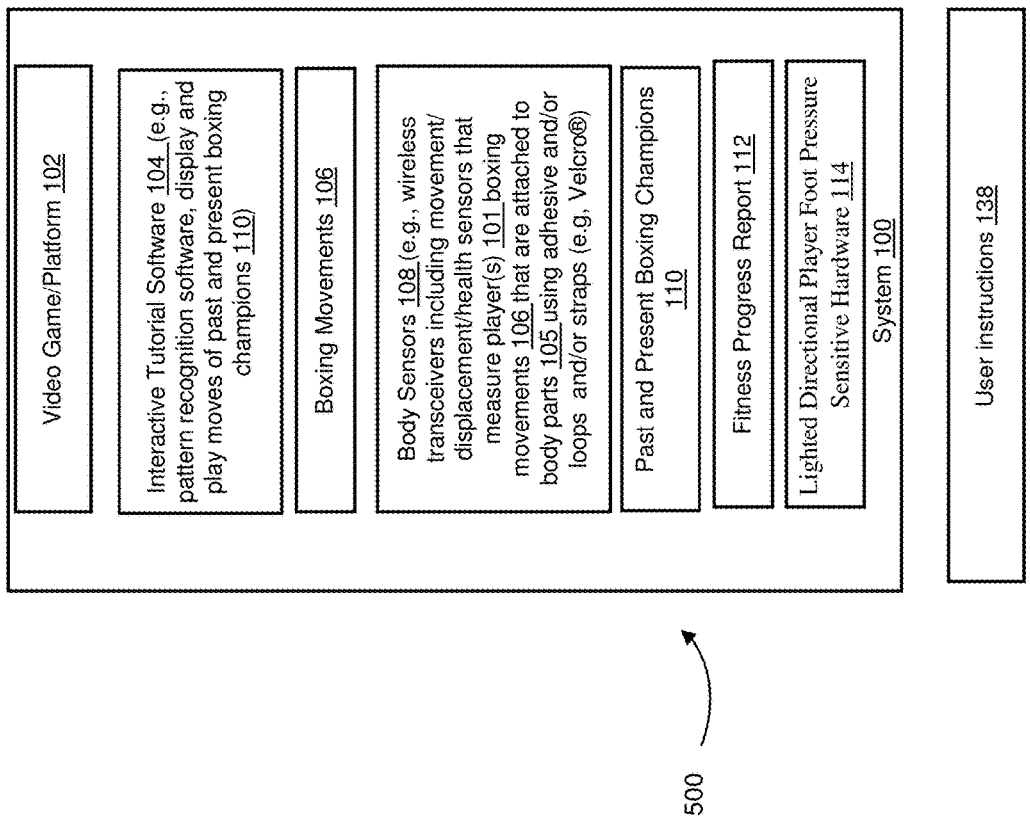
FIG. 5 is a kit illustrating Boxing Motion System 100 according to an embodiment of the present invention of FIG. 1.

FIG. 5 is a kit illustrating Boxing Motion System 100 according to an embodiment of the present invention of FIG. 1.

Referring now to FIG. 5, showing Boxing Motion System 100. Boxing Motion System 100 may be sold as kit 500 comprising the following parts: at least one video game/platform 102; at least one interactive tutorial software 104; at least one set of body sensors 108; at least one video monitor 103; and at least one set of user instructions 138. The kit has instructions such that functional relationships are detailed in relation to the structure of the invention (such that the invention can be used, maintained, or the like in a preferred manner). Boxing Motion System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 6:
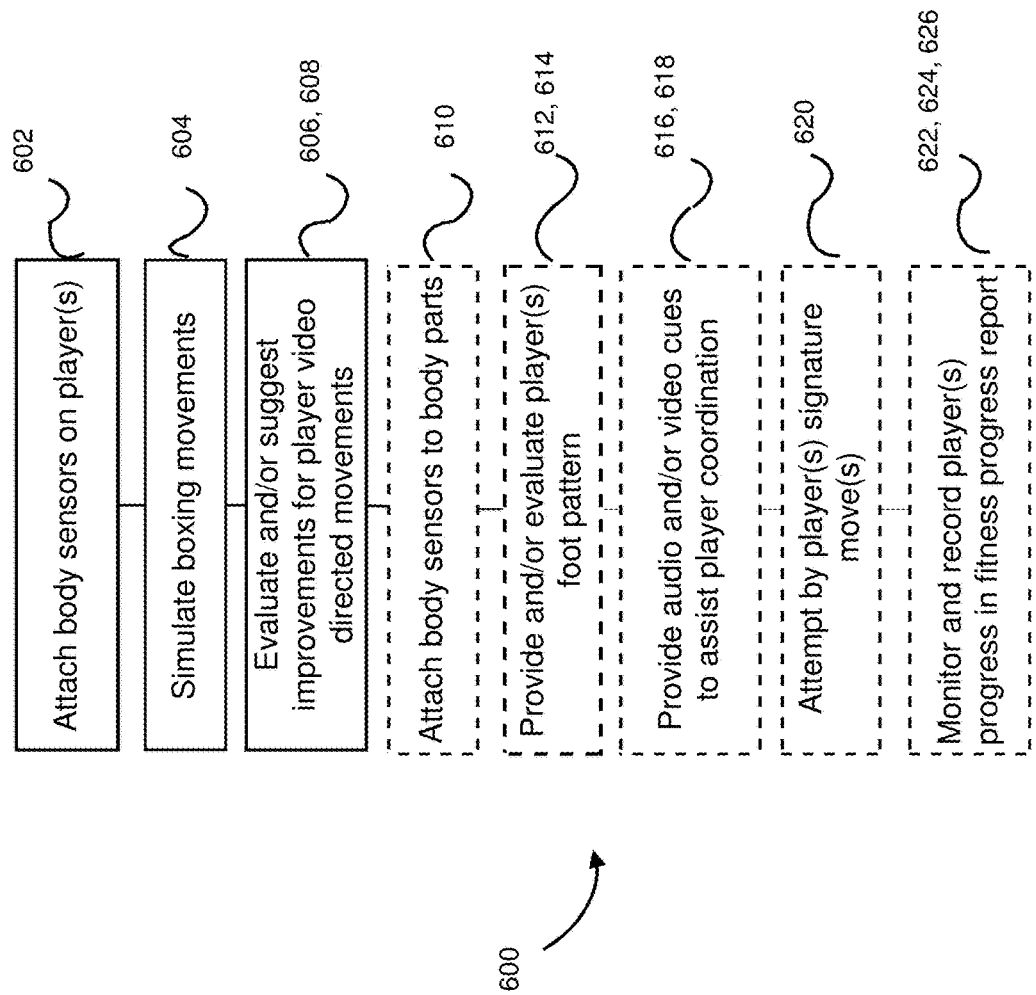
FIG. 6 is a flowchart illustrating a method of use for Boxing Motion System 100 according to an embodiment of the present invention of FIGS. 1-5.

FIG. 6 is a flowchart illustrating a method of use for Boxing Motion System 100 according to an embodiment of the present invention of FIGS. 1-5.

Referring now to FIG. 6, method 600 is disclosed for training one or more players 101 using boxing video game and monitoring system 100. In step 602, attaching one or more body sensors 108 to one or more body parts 105 of one or more players 101. In step 604, simulating on video game/platform 102 using interactive tutorial software 104 providing boxing movements 106 of past and present boxing champions 110 on sport of boxing. In step 606, evaluating by one or more body sensors 108 player video directed movements 106. In step 608, providing suggestions to improve movements 106 of one or more players 101 as one or more players 101 are replicating boxing movements 106 of past and present boxing champions 110. For example, display 103 can indicate progress of one or more players 101, for example, using visual/audio indicators, for example, displayed as part of fitness progress report 112.

In step 610, attaching one or more body sensors 108 to one or more body parts 105 including attaching one or more body sensors 108 to a heart, a right hand, a left hand, a right leg, a left leg, and a stomach of one or more players 101. In step 612, providing a pattern of player footwork timed with player eye motions and player hand punching motions as directed by moments of player video.

In step 614, evaluating by one or more lighted directional player foot pressure sensitive hardware 114 and a pattern recognition software 104 movements 106 of one or more players' 101; and providing real-time feedback and monitoring of foot work to one or more players 101. In step 616, vibrating or other audio cues by one or more body sensors 108 that assist coordination between punching and blocking motions and foot work of one or more players 101. In step 618, monitoring and tracking by one or more body sensors 108 including electronic motion between arm to arm motion responsive to foot work and in coordination between one or more of players' 101 actual or predicted motion.

For example, as illustrated in FIG. 4, wireless communication(s) link player(s) 101 movements, e.g., changes of player(s) 101 body parts 105 absolute/relative coordinate positions, e.g., X, Y, Z, of body sensor(s) 108, between computer 200 and recommended or suggested movements by tutorials provided by interactive tutorial software 104 displayed on display 103, for example, communicated through Wi-Fi router 117.

In step 620, programming by interactive tutorial software 104 as an interactive game; and attempting by each player of one or more players 101 simulate successful signature moves of past and present boxing champions 110 including at least one of Sugar Ray Robinson's lateral footwork and power combos; Muhammad Ali's rope-a-dope; Floyd Mayweather's Pull Counter and Lunging Left Hook; and Manny Pacquiao's one legged straight left.

In step 622, monitoring and recording of one or more players 101 coordination, concentration, strength of punching, different fighting styles, and signature moves of past and present boxing champions 110; and providing as a portion of a fitness progress report 112 including percentage of full body workout completed at an end of one or more boxing sessions for each player of one or more players 101.

In step 624, participating by one or more players 101 in one or more simulated sparing contests with past and present boxing champions 110 of boxing and one or more players 101 performance includes strength and punching skill level is reported as part of a fitness progress report 112. In step 626, participating by one or more players 101 in one or more simulated sparing contests with past and present boxing champions 110 of boxing for training exercises as well as general amusement; monitoring one or more players 101 to determine adherence to boxing rules and regulations; and generating fitness report 112 that highlights strength, accuracy, and punch connection percentage replicating boxing movements 106 simulated by interactive tutorial software 104 of boxing movements 106 of past and present boxing champions 110 of one or more players 101.

It should be noted that step(s) 610-626 is/are an optional step(s) and may not be implemented in all cases. Optional steps of method 600 are illustrated using dotted lines in FIG. 6 so as to distinguish them from the other steps of method 600.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other Boxing Motion System 100 arrangements such as, for example, Boxing and Motion training, etc., may be sufficient.

Those with ordinary skill in the art will now appreciate that upon reading this specification and by their understanding the art of Boxing Motion System as described herein, methods of Boxing Motion System will be understood by those knowledgeable in such art.

What is claimed is new and desired to be protected by Letters Patent is set forth in the appended claims:

1. A boxing video game and monitor system for one or more players, the system comprising:
   a video game/platform having an interactive tutorial software on sport of boxing configured to simulate boxing movements of past and present boxing champions; and
   one or more body sensors attached to one or more body parts of the one or more players, the one or more body sensors configured to evaluate player video directed movements and make suggestions to improve movements of the one or more players when the one or more players are replicating the boxing movements of the past and the present boxing champions.

2. The system of claim 1, wherein the one or more body parts include a heart, a right hand, a left hand, a right leg, a left leg, a forehead, and a stomach of the one or more players.

3. The system of claim 1, wherein the player video directed movements include provide a pattern of player footwork timed with player eye motions and player hand punching motions.

4. The system of claim 1, wherein the video game/platform includes one or more lighted directional player foot pressure sensitive hardware and a pattern recognition software that evaluates the one or more players' movements and provides real-time feedback and monitoring of foot work to the one or more players.

5. The system of claim 1, wherein the one or more body sensors configured to vibrate or provide other audio cues that assist coordination between punching and blocking motions and foot work of the one or more players.

6. The system of claim 1, wherein the one or more body sensors are electronic motion monitors that track coordination between arm to arm motion responsive to foot work and in coordination between one or more of the players' actual or predicted motion.

7. The system of claim 1, wherein the interactive tutorial software would be programmed as an interactive game, wherein each player of the one or more players attempts to simulate successful signature moves of the past and present boxing champions including at least one of Sugar Ray Robinson's lateral footwork and power combos; Muhammad Ali's rope-a-dope; Floyd Mayweather's Pull Counter and Lunging Left Hook; and Manny Pacquiao's one legged straight left.

8. The system of claim 1, wherein one or more players coordination, concentration, strength of punching, different fighting styles, and signature moves of the past and present boxing champions are monitored and recorded and provided as a portion of a fitness progress report including percentage of full body workout completed at an end of one or more boxing sessions for each player of the one or more players.

9. The system of claim 1, wherein the one or more players participate in one or more simulated sparing contests with the past and present boxing champions and the one or more players performance including strength and punching skill level is reported as part of a fitness progress report.

10. The system of claim 1, wherein the one or more players participate in one or more simulated sparing contests with the past and present boxing champions for training exercises as well as general amusement; wherein the one or more players are monitored to determine adherence to boxing rules and regulations; and wherein a fitness report is provided that highlights strength, accuracy, and punch connection percentage upon replication of the boxing movements simulated by the interactive tutorial software with the boxing movements of the past and present boxing champions with the one or more players.

11. A method for training one or more players using a boxing video game and monitoring system, the method comprising:
attaching one or more body sensors to one or more body parts of the one or more players;
simulating on a video game/platform using an interactive tutorial software boxing movements of past and present boxing champions on sport of boxing;
evaluating by the one or more body sensors player video directed movements; and
providing suggestions to improve movements of the one or more players as the one or more players are replicating the boxing movements of the past and the present boxing champions.

12. The method of claim 11, comprising attaching the one or more body sensors to the one or more body parts including attaching the one or more body sensors to a heart, a right hand, a left hand, a right leg, a left leg, a forehead, and a stomach of the one or more players.

13. The method of claim 11, wherein providing a pattern of player footwork timed with player eye motions and player hand punching motions as directed by moments of the player video.

14. The method of claim 11, comprising evaluating by one or more lighted directional player foot pressure sensitive hardware and a pattern recognition software movements of the one or more players'; and providing real-time feedback and monitoring of foot work to the one or more players.

15. The method of claim 11, comprising vibrating or other audio cues by the one or more body sensors that assist coordination between punching and blocking motions and foot work of the one or more players.

16. The method of claim 11, comprising monitoring and tracking by the one or more body sensors including electronic motion between arm to arm motion responsive to foot work and in coordination between one or more of the players' actual or predicted motion.

17. The method of claim 11, comprising programming by the interactive tutorial software as an interactive game; and attempting by each player of the one or more players simulate successful signature moves of the past and present boxing champions including at least one of Sugar Ray Robinson's lateral footwork and power combos; Muhammad Ali's rope-a-dope; Floyd Mayweather's Pull Counter and Lunging Left Hook; and Manny Pacquiao's one legged straight left.

18. The method of claim 11, comprising monitoring and recording of one or more players coordination, concentration, strength of punching, different fighting styles, and signature moves of the past and present boxing champions; and providing as a portion of a fitness progress report including percentage of full body workout completed at an end of one or more boxing sessions for each player of the one or more players.

19. The method of claim 11, comprising participating by the one or more players in one or more simulated sparing contests with the past and present boxing champions and the one or more players performance including strength and punching skill level is reported as part of a fitness progress report.

20. The method of claim 11, comprising participating by the one or more players in one or more simulated sparing contests with the past and present boxing champions for training exercises as well as general amusement; monitoring the one or more players to determine adherence to boxing rules and regulations; and generating a fitness report that highlights strength, accuracy, and punch connection percentage replicating the boxing movements simulated by the interactive tutorial software of the boxing movements of the past and present boxing champions of the one or more players.

* * * * *